United States Patent [19]
Ettelman

[11] 3,753,088
[45] Aug. 14, 1973

[54] DEVICE FOR TESTING THE ADEQUACY OF ELECTRICAL CIRCUIT SUCH AS THE GROUND CIRCUIT OF AN EXTENSION CORD

[75] Inventor: David J. Ettelman, Cranford, N.J.

[73] Assignee: Multi-Amp Corporation, Cranford, N.J.

[22] Filed: July 19, 1971

[21] Appl. No.: 164,072

Related U.S. Application Data

[62] Division of Ser. No. 857,796, Sept. 15, 1969, Pat. No. 3,643,157.

[52] U.S. Cl. ................................ 324/51, 324/73
[51] Int. Cl. ...................... G01r 31/02, G01r 15/12
[58] Field of Search ............. 324/51, 73; 340/255; 317/18

[56] References Cited
UNITED STATES PATENTS

| | | | |
|---|---|---|---|
| 2,858,507 | 10/1958 | Liautaud et al. | 324/73 R |
| 3,402,326 | 9/1968 | Guasco et al. | 317/18 A |
| 3,515,941 | 6/1970 | Moore et al. | 317/18 A |
| 3,611,133 | 10/1971 | Tsergas | 324/51 X |

Primary Examiner—Gerard R. Strecker
Attorney—Robert Scobey et al.

[57] ABSTRACT

Device for testing the adequacy of the ground and power circuits of electric tools, extension cord and the like by performing an automated series of individual tests in sequence. The major tests are to determine: open ground circuit, faulty ground circuit, short circuit and poor insulation. If no faults are found by these tests, the circuit under test is next connected to line potential to determine if it operates properly. During this phase of testing, the potentials and currents associated with the previous tests are discontinued to avoid power drain and heating. A saturating current transformer protects an essential relay from damage from excessive current. A long extension cord having a proper ground resistance (in the order of the resistance exhibited by a tool having a faulty ground cord) may be tested by modifying the test currents so that an erroneous faulty ground indication is not given.

4 Claims, 5 Drawing Figures

PATENTED AUG 14 1973 3,753,088

DEVICE FOR TESTING THE ADEQUACY OF ELECTRICAL CIRCUIT SUCH AS THE GROUND CIRCUIT OF AN EXTENSION CORD

CROSS REFERENCE TO RELATED APPLICATION

This application is a division of my co-pending Application Ser. No. 857,796, filed 15 Sept. 1969 for DEVICE FOR TESTING THE ADEQUACY OF ELECTRIC TOOLS, EXTENSION CORDS AND THE LIKE, now U.S. Pat. No. 3,643,157 issued Feb. 15, 1972.

BACKGROUND AND SUMMARY OF THE INVENTION

The invention is in the field of devices for testing the adequacy of electric tools, such as electric drills, electric motors, soldering irons, and the like, and for testing the adequacy of electric conductors, such as extension cords and the like. It is an improvement of the testing device disclosed in U.S. Pat. No. 2,858,507, issued Oct. 28, 1958, to Liautaud et al.

For various reasons electric tools and extension cords develop a variety of electrical defects which may be dangerous to an operator, or may otherwise impede the usefulness of the tool or extension cord. In order to prevent danger to personnel, and in order to prevent work delays due to lack of properly operable equipment, electric tools and extension cords may be inspected periodically for actual and potential defects. To carry out such inspections by skilled personnel may, however, become excessively expensive and time consuming, particularly in a large industrial installation where a great number of tools and extension cords may be in use.

There is a need, therefore, for a compact testing device which may be used by unskilled personnel and which would indicate quickly and in an easy-to-understand fashion whether a tool or an extension cord has developed or is developing electrical defects, and the nature of such defects.

There have been various testing devices used for this purpose in the past, one of which is described in the U.S. patent to Liautaud et al., above. The improvement to which the present application is directed includes making special provisions for testing long extension cords, particularly, to modify the test currents so that an extension cord having a proper ground resistance which is in the order of a faulty ground resistance for the cord of a tool does not result in a faulty ground indication. Broadly stated, the present invention is directed to a device for testing different circuits in which electrical characteristics (e.g., resistances) may vary, but which includes means for varying the indication otherwise produced by an indicating device so that substantially identical output indications are provided under appropriate circumstances when the different circuits are tested.

The tests described below are designed to detect the existence of and to identify various electrical defects in equipment. In the course of its operation, the testing device may subject a tool or a cord to voltages and currents which exceed the normal voltages and currents which the tool or cord encounters in normal use, for the purpose of detecting certain defects which may not be immediately apparent in normal operation.

DETAILED DESCRIPTION

Figure 1:
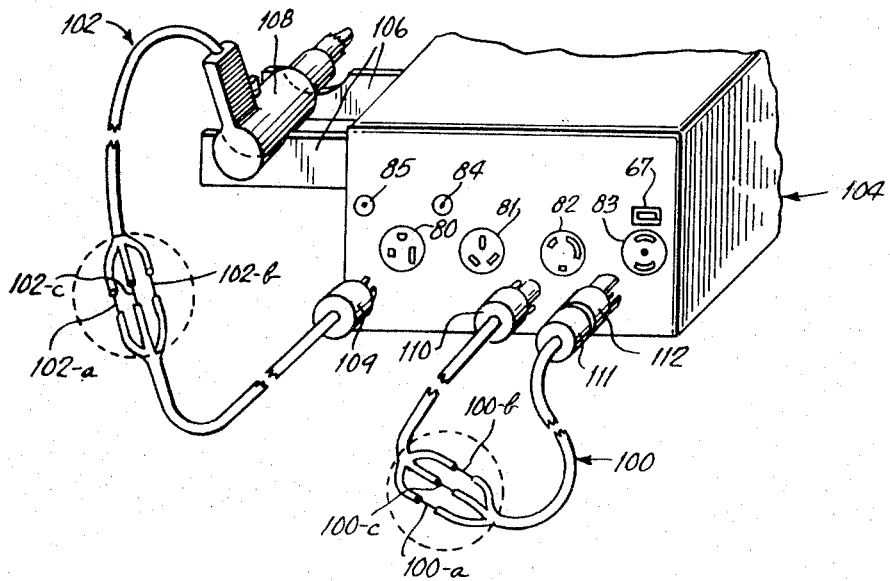
FIG. 1 is a fragmentary perspective view of a testing device in accordance with the invention.

The testing device may be housed in a structure such as a box 104 (conductive or nonconductive), illustrated schematically in FIG. 1. A pair of conductive (metal) brackets 106, which may be provided for supporting an electric tool under test, extend from the box 104 and are connected electrically to the box ground.

The exemplary tool illustrated in FIG. 1 is a standard electrid drill which has a metal housing 108 making electrical contact with the supporting brackets 106. The drill has a cord 102 which, as seen in the exploded view thereof, includes three leads, each having a sleeve of insulating material enclosing a conductor. The reference numerals 102-a, 102-b, and 102-c refer respectively to the two power leads and to the ground lead which is connected to the housing 108. The cord 102 terminates in a male plug 109 which, depending on the configuration of its prongs, may be plugged into one of receptacles 80, 81 and 82. Should the male plug 109 be incompatible with any of the shown receptacles, an appropriate adaptor may be used.

Also shown in FIG. 1 is an extension cord 100 which may terminate at one end of a male plug 110 for plugging, directly or through an adaptor, into one of the receptacles 80, 81 and 82, and may terminate at the other end in a female receptacle 111 for connection, through an appropriate adaptor 112, to a receptacle 83. The leads of the extension cord 100 are shown in an exploded view where the reference numerals 100-a, 100-b and 100-c refer respectively to the two power leads and to the ground lead. Each of the leads is enclosed in a sleeve of insulating material broken off to show the conducting lead.

The tool and extension cord have been shown together in FIG. 1 for convenience. In use only one device is tested at any time.

Reference numeral 84 refers to a jack connected to the ground prongs of the receptacles 80, 81 and 82, and reference numeral 85 refers to a jack connected to the ground of the box 1. For the purpose of allowing the tester to follow its preset sequence of steps in testing a two-wire tool or extension cord (no ground lead), jacks 84 and 85 are connected to each other by means of a jumper lead (not shown). In the above case, the term "ground circuit" of a tool or an extension cord includes the jumper leads associated with the jacks 84 and 85. The term "power circuit" includes the circuit between the prongs of the power leads of a cord associated with a tool or an extension cord.

Figure 2:
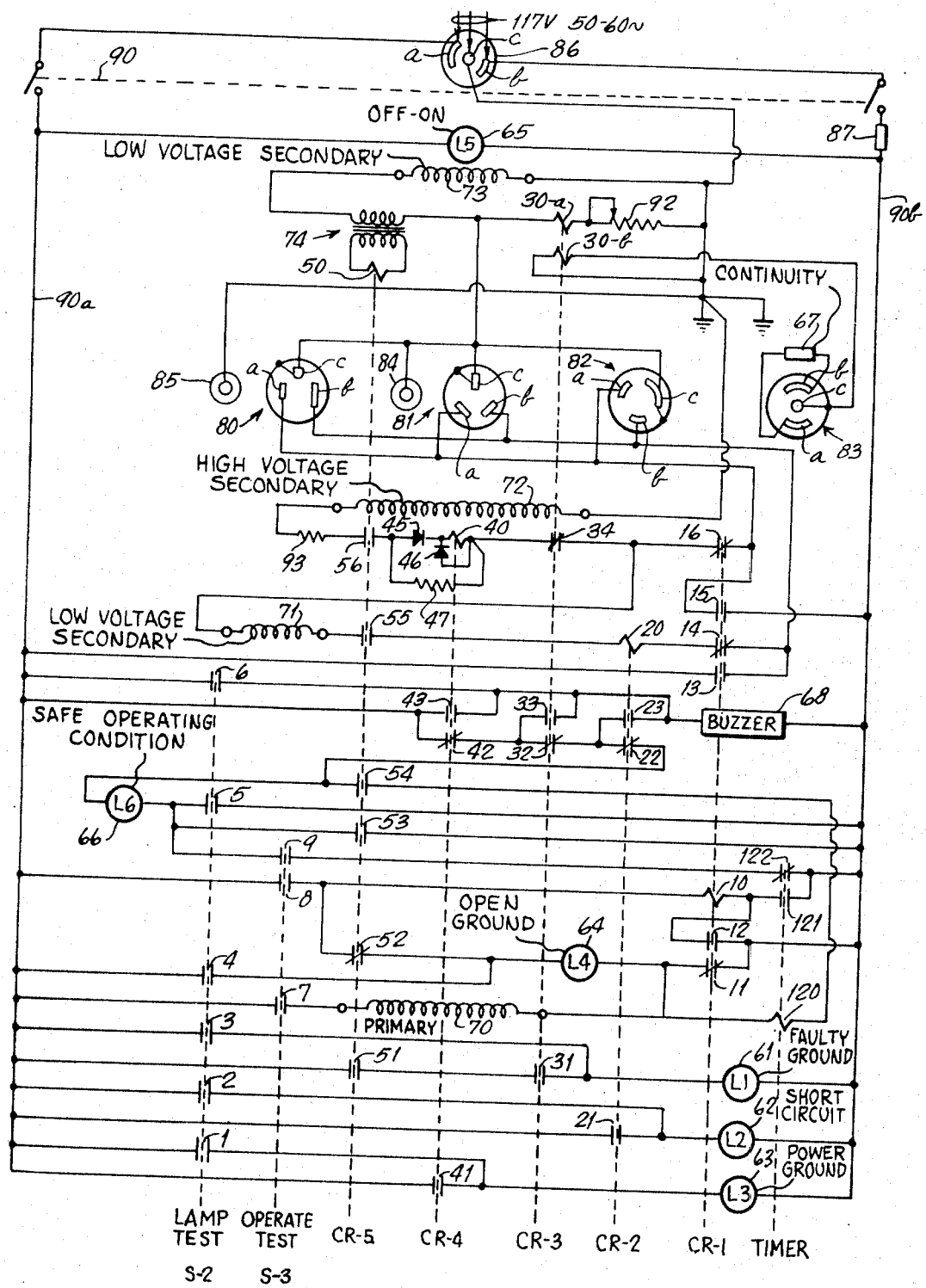
FIG. 2 is a schematic diagram of circuitry embodying the invention.

FIG. 2 illustrates the electrical circuitry housed in the box 104. The circuit employs relays CR-1 through CR-5, respectively having windings 10, 20, 30-a and 30-b, 40 and 50, and a number of contacts (shown in the deenergized states of the windings) along the broken lines running vertically in the figure and intercepting the windings. A Timer represented by a winding 120 and contacts 121 and 122 starts running when the winding 120 is energized and runs for a predetermined time interval at the end of which it closes contacts 121 and opens contacts 122. The circuit also includes indicator lights 61 through 67 and a buzzer 68, each of which is turned on by current flow through it.

A power transformer having a primary winding 70 and secondary windings 71, 72 and 73 is included. The circuit of FIG. 2 is energized through a receptacle 86 connected to a source of A.C. potential through an Off-On switch 90 and through an appropriate fuse 87. A single throw-six pole switch S-2 labeled Lamp Test has normal open contacts 1 through 6 and is used to turn on the indicator lights 61, 62, 63, 64 and 66 and the buzzer 68, so that an operator of the testing device can make sure that the lights and the buzzer are in good order before proceeding with the test. A single throw-three pole switch S-3 labeled Operate Test has contacts 7, 8 and 9, and is used to initiate the testing procedure of the testing device.

An electric device, such as an electric drill, is positioned on the brackets 106 and connected as previously described.

Once the tool to be tested is properly connected, the Off-On switch 90 is closed and a lamp and buzzer test may be completed by the operator of the testing device by momentarily closing the Lamp Test switch S2. When the switch S-2 is closed, current flows through its contacts 1 through 6, and indicator lamps 61, 62, 63, 64 and 66, as well as the buzzer 68 should be activated. If one or more of the indicator lights fail to light, or if the buzzer 68 fails to sound, the testing device should be repaired before the test is proceeded with. Once it is established that the testing device is in proper order, the test procedure may be started by closing the Operate Test switch S-3 and holding it in closed position so that current can flow through its contacts 7, 8 and 9. Upon the closing of the contacts 7, current flows from the power line lead 90-a through the closed contacts 7, the primary winding 70 of the power transformer, the normally closed contacts 11 of the relay CR-1, to the power lead 90-b. All power transformer secondary windings are now energized.

Figure 3:
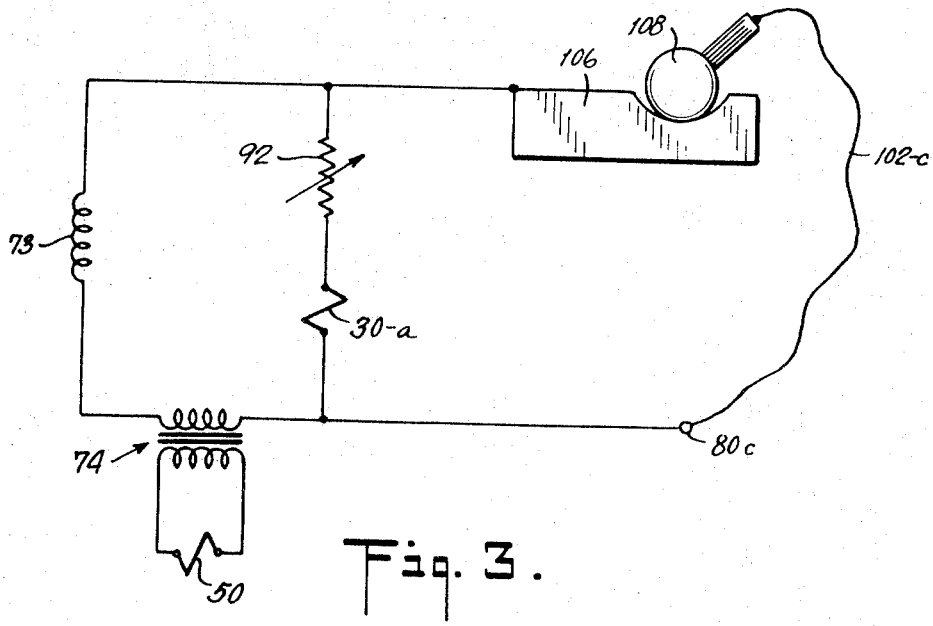
FIG. 3 is an abbreviated schematic diagram of a part of the circuit of FIG. 2 which is used to provide overload protection by means of a saturating current transformer.

A part of the circuit associated with the secondary winding 73 is illustrated schematically in FIG. 3. The secondary winding 73 of the power transformer is in series with the primary winding of a saturating current transformer 74. The secondary winding of the transformer 74 is in series with the winding 50 of the relay CR-5. The primary winding of the transformer 74 is connected in a circuit including winding 30-a of the relay CR-3, a variable resistor 92, the ground lead 102-c of the cord 102 connected to the ground prong of the receptacle 80-c (for example) and the metal housing 108 of the tool under test connected to the brackets 106. The purpose of the transformer 74 is to protect the winding 50 from excessive amounts of current for long time periods that flow during a ground conductor test. Here, the heavy current from the power transformer secondary 73, which circulates in the primary of transformer 74, appears as a lesser current in the secondary circuit. Thus the current through winding 50 is limited to the value determined by the saturating characteristics of the transformer 74.

The circuit of FIG. 3 otherwise operates in the same fashion as in the Liautaud et al. patent mentioned above, except that variable resistor 92 permits a sensitivity adjustment normally required only at assembly of the testing device. For example, to explain the operation, a ground circuit resistance of over about 2 ohms, representing an open ground circuit, causes winding 30-a to be energized to a point which actuates relay CR-3; a resistance of approximately 1 ohm, representing a faulty ground circuit, causes both windings 50 and 30-a to be energized to points which actuate concurrently relays CR-5 and CR-3, respectively; a resistance of approximately one-half ohm or less, representing a good ground circuit, causes winding 50 to be energized to a point which actuates relay CR-5. In all of these cases, the appropriate indicator light is energized. In the first two cases, the buzzer 68 also sounds and the timer winding 120 is not energized thereby preventing completion of the cycle. In the last case, since it represents a safe operating condition, the timer winding 120 is energized and the cycle is automatically completed.

The saturating current transformer 74 operates in the same fashion to limit current flow through winding 50 in the testing of extension cords. Electric cords are subjected to a set of tests similar to that applied to electric tools (circuits of a first type), but not identical, because extension cords (circuits of a second type) have certain unique characteristics (resistances). For example, while the ground circuit of electric tools is generally short — usually 6 feet and almost always less than 25 feet, the ground circuit of an extension cord may be anywhere from a few to over a hundred feet. If the ground circuit of a good extension cord is, for example 25 feet, its resistance is less than one-half ohm and it can be successfully tested in a manner identical to that applied to ground circuits of electric tools. But if the ground circuit of an extension cord is of the order of, say, 100 feet, its resistance may be nearer 1 ohm and a test identical to that applied to electric tools may indicate a faulty ground circuit, even though the extension cord may be in perfect shape. The test device decribed below obviates problems of this nature and gives indications of the adequacy of extension cords of a wide range in length.

Once the extension cord is connected properly, the testing device is turned on and switches S-2 and S-3 are operated, all as previously described. Current flow is now established through the primary winding 70 of the power transformer and all secondary windings are energized (to generate testing electrical signals) as described above.

Figure 4:
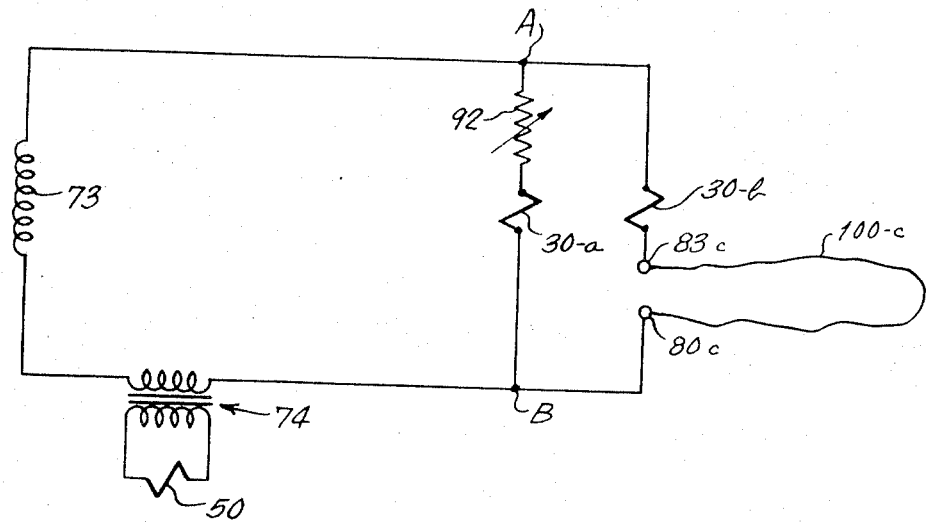
FIG. 4 is an abbreviated schematic diagram of a part of the circuit of FIG. 2 used during testing the adequacy of the ground circuit of an extension cord.

FIG. 4 shows the part of the circuit of FIG. 2 under consideration. Saturating current transformer 74 operates to limit current flow in winding 50 as described above. Variable resistor 92 and winding 30a of the relay CR-3 are included in the circuit as in FIG. 3. New to the circuit for extension cord testing (i.e., active only during a test of a "second type" of circuit) is a winding 30-b in series with ground conductor 100-c. The winding 30-b is wound together with the winding 30-a of the relay CR-3 such that the electromagnetic fields of the two windings interact. The two windings are connected so that the fields therefrom oppose each other (winding 30-b is a bucking coil). As a practical example, winding 30-a may include ten or more times the turns of winding 30-b and be of a wire diameter much smaller than that of winding 30-b. The result is that a current such as one-half ampere flowing in winding 30-a will operate relay CR-3 with no current in 30-b as in the case of an open ground. On the other hand, with the same one-half ampere flowing in 30-a, currents in the range of 10-20 amperes in 30-b (e.g., good ground in a long extension cord) will prevent operation of CR-3 (varying the out-put indication otherwise provided) and thereby prevent a misleading indication of a faulty ground. It should be noted that the variable resistor 92 permits adjustment of the current flow through winding 30-a.

ELECTRIC CORD — OPEN GROUND CIRCUIT

As a first situation, suppose that the ground lead 100-c is open, e.g., that its resistance is more than 2 ohms. Most of the voltage generated by the secondary winding 73 (see FIG. 4) appears across the points A and B because the overall current from winding 73 is relatively low. Under these conditions winding 30-a controls, energizing relay CR-3. In reference to FIG. 2, once the relay CR-3 is energized, its normally closed contacts 32 and 34 open, and its normally open contacts 31 and 33 close. Upon the closing of contacts 33, the buzzer 68 is turned on by the circuit established through contacts 42 and 33. The Open Ground indicator light 64 is turned on in the circuit established by the closed contacts 8, 52 and 11. The Safe Operating Condition light 66 is not energized because the contacts 32, in series with it, are open. Thus, the buzzer 68 is on to indicate the presence of a defect, and the Open Ground indicator light 64 is on to indicate the nature of the defect. Although the contacts 31 are closed, the Faulty Ground light 61 is not energized because relay CR-5 is not actuated and contacts 51 are open. CR-5 is not actuated since the current through winding 50 is insufficient. The testing device cannot proceed with further tests because contacts 54 of relay CR-5 remain open, preventing winding 120 of the Timer from being energized. The test may be discontinued by opening the Off-On switch 90 and the cord under test may be unplugged.

ELECTRIC CORD — FAULTY GROUND CIRCUIT

As a second situation in this set of tests, suppose that the ground circuit of the extension cord has a resistance slightly over 1 ohm, for example. The testing device operates in the same manner as with an electric tool whose ground circuit is between 1 and 2 ohms in resistance, i.e., both current relays CR-3 and CR-5 are energized, and the Faulty Ground indicator light 61 and the buzzer 68 are turned on. The relay CR-5 is energized because an appreciable current flows through winding 74. Current flow through bucking coil 30-b is not sufficient to prevent energization of relay CR-3 by winding 30-a, which still controls because an appreciable voltage still appears across points A and B. The buzzer 68 indicates that the cord under test is defective and the Faulty Ground indicator light 61 shows the nature of the defect. The Open Ground light 64 is not energized because contacts 52 are open due to actuation of relay CR-5.

After a Faulty Ground circuit has been detected, the Timer circuit is prevented from being energized as described above.

ELECTRIC CORD — GOOD GROUND CIRCUIT

But, suppose as a third situation, that the resistance of the ground circuit under test is considerably less than in the two previous cases, e.g., below 1 ohm. The effect of the voltage appearing across the winding 30-a and the current through winding 30-b is such that the fields from the two windings cancel each other, preventing actuation of relay CR-3. The net current through winding 74 is sufficient to cause actuation of relay CR-5.

Upon the actuation of relay CR-5, other tests proceed, as set forth in the Liautaud et al. patent noted above, involving high voltage secondary 72 and low voltage secondary 71. The high voltage of secondary 72 is applied between the power conductors of the extension cord and ground, and any leakage therebetween sufficient to energize winding 40 to a point sufficient to actuate relay CR-4 results in Power Ground light 63 being turned on. The low voltage of secondary 71 is applied between the power conductors of the extension cord. Any unusually low resistance between these two conductors results in a current sufficient to energize winding 20 to a point sufficient to actuate relay CR-2 and turn on Short Circuit light 62. Realys CR-2 and CR-4 are adjusted to sensitivities commensurate with the currents to be measured.

At this same time, and as long as relays CR-2 and CR-4 are not actuated, the Safe Operating Condition light 66 is on in the circuit established through contacts 42, 32, 22, 9 and 122 to indicate that the ground circuit of the cord under test is adequate. The Open Ground indicator light 64 is turned off because of the opening of contacts 52 in series with it. The Timer motor is now turned on because its winding 120 is in a circuit established through contacts 42, 32, 22, 54, and contacts 11. The Timer starts running through its predetermined time delay.

Once the delay period is over, the normally open contacts 121 close the normally closed contacts 122 open. With the closing of contacts 121, a circuit including the winding 10 of the relay CR-1 is established, and relay CR-1 is actuated. Contacts 11 of relay CR-1 now open, and the power transformer primary 70 no longer has its rated voltage applied to it. All secondary windings 71, 72 and 73 are deenergized and no heat-generating currents can flow therefrom. In particular, the low voltage from secondary winding 73 is removed by deenergization of the winding, and the heat generation by the current flow therefrom is discontinued. In the Liautaud et al. patent noted above, the secondary windings 71 and 72 are decoupled from the circuit under test. The secondary winding 73, however, remains coupled to the circuit under test, and the substantial current flowing therefrom results in substantial heat generation. It is possible to decouple the secondary winding 73 in the same fashion as are the other two secondary windings. However, arcing across any contacts used to decouple is one reason why deenergization of the secondary winding 73 is preferred. By virtue of the actuation of relay CR-1, contacts 13 and 15 apply line voltage to the extension cord under test. Light 67 will turn on, indicating continuity, if the extension cord is continuous. If this light 67 does not turn on, a break in the cord is indicated.

The action of the Timer just explained to prevent heat generation is the same for tools as well as cords.

It should be noted in connection with FIG. 2, that the resistor 93 serves to limit current, while resistor 47 is a sensitivity adjustment for the winding 40 of relay CR-4. The diodes 45 and 46 serve to provide D.C. operation and arc suppression, respectively, if desired in connection with winding 40.

Figure 5:
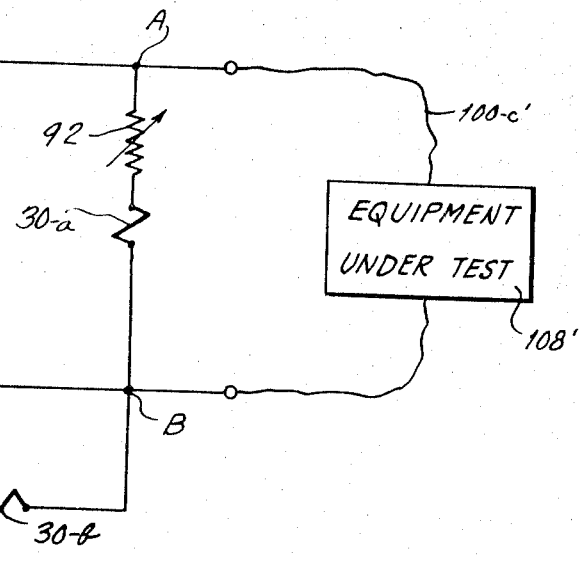
FIG. 5 is a schematic circuit diagram of a circuit similar to that of FIG. 3 to permit ground circuit testing involving relatively low magnitude currents.

FIG. 5 shows a circuit similar to FIG. 3 for testing equipment in which the testing currents applied to the ground circuit under test must be limited in magnitude to a value much lower than encountered in the circuit in FIG. 3, e.g., in the neighborhood of 20 percent of that of the FIG. 3 circuit. The circuit of FIG. 5 uses the winding 30-b of FIG. 4 for this purpose. Like reference numerals have been used in FIG. 5 to designate like components with respect to FIG. 3. In FIG. 5 winding 50' is similar to winding 50 of FIG. 3; a saturating current transformer is not required in the circuit of FIG. 5, since the currents are much lower and there is no danger of overloading the winding 50'. Winding 30-b is the same as that in FIG. 4, except it is connected differently in the circuit so that the fields from windings 30-a and 30-b aid each other. Windings 30-a and 30-b actuate the relay CR-3. The variable resistor 92' is similar to variable resistor 92 and is used to adjust the current flowing through winding 30-b, normally only at assembly of the testing device.

In the circuit of FIG. 5, the same resistances in ground circuit 100-c' of equipment 108' under test as in the circuit of FIG. 3 are used as an indication of ground circuit quality, e.g.:

open ground circuit — greater than 2 ohms;
faulty ground circuit — approximately 1 ohm;
good ground circuit — less than one-half ohm.

Since the testing currents are restricted to much lesser values, the winding 30-b is used to provide a field which aids that from winding 30-a to properly actuate the relay CR-3.

I claim:

1. A device for testing the adequacy of electric circuits of both a first and a second type, in which an electrical characteristic of a circuit of the first type is adequate if within a first range and the electrical characteristic of a circuit of the second type is adequate if within a second range different from said first range, including means for generating testing electrical signals, means for applying said signals to a circuit under test which is one of said two type, and means for detecting the electrical response of the circuit under test and providing an indication of said resonse which is representative of said electrical characteristic of the circuit under test, wherein the improvement comprises:

means coupled to said detecting means and active only when a circuit of one of said types is under test for varying the indication provided by the detecting means to produce substantially identical indications when a first type circuit under test has its characteristic within said first range and a second type circuit has its characteristic within said second range.

2. A device for testing the adequacy of electrical circuiJs of more than one type of electrical device, such as the ground circuit of an extension cord and the ground circuit of an electrical tool, including means for generating testing electrical signals coupled to a parallel combination having as one leg an electrical circuit under test and as the other leg a first winding, the field from said winding controlling the energization of an indicating device, wherein the improvement comprises:

a second winding active only when an electrical circuit of one particular type is under test and responsive to the current flowing in a portion of the combination for providing a field coacting with the field from the first winding to vary the energization of said indicating device to cause substantially identical output indications by said indicating device for different types of circuits under test notwithstanding the fact that the currents through said first winding vary for said different types of circuits under test.

3. A device as in claim 2, in which the second winding is in the leg with the circuit under test and produces a field opposing the field from the first winding.

4. A device as in claim 2, in which the second winding is responsive to said testing electrical signals and produces a field that adds to the field from the first winding.

* * * * *